(12) United States Patent
Rao et al.

(10) Patent No.: US 10,491,298 B2
(45) Date of Patent: Nov. 26, 2019

(54) HYBRID RANDOM FIBER LASER DISTRIBUTED AMPLIFICATION METHOD BASED ON ERBIUM FIBER WITH LOW DOPING CONCENTRATION

(71) Applicant: University of Electronic Science and Technology of China, Chengdu, Sichuan (CN)

(72) Inventors: Yunjiang Rao, Sichuan (CN); Yun Fu, Sichuan (CN); Jiaqi Li, Sichuan (CN); Zinan Wang, Sichuan (CN)

(73) Assignee: University of Electronic Science and Technology of China, Chengdu, Sichuan (CN)

( * ) Notice: Subject to any disclaimer, the term of this patent is extended or adjusted under 35 U.S.C. 154(b) by 0 days.

(21) Appl. No.: 16/166,096

(22) Filed: Oct. 20, 2018

(65) Prior Publication Data

US 2019/0058524 A1 Feb. 21, 2019

(30) Foreign Application Priority Data

Jul. 11, 2018 (CN) .......................... 2018 1 0759850

(51) Int. Cl.
| | | |
|---|---|---|
| *H04J 14/02* | (2006.01) | |
| *H04B 10/25* | (2013.01) | |
| *H04B 10/50* | (2013.01) | |
| *H04B 10/291* | (2013.01) | |

(52) U.S. Cl.
CPC ......... *H04B 10/25* (2013.01); *H04B 10/2912* (2013.01); *H04B 10/2916* (2013.01); *H04B 10/503* (2013.01); *H04J 14/02* (2013.01)

(58) Field of Classification Search
CPC .................................................................
H04B 10/25; H04B 10/2912; H04B 10/2916; H04B 10/503; H04B 10/291; H04B 10/2935; H04J 14/02; H04J 14/0221; H01S 3/302; H01S 3/1608; H01S 3/30; H01S 3/094042; H01S 3/067; H01S 3/06754; H01S 3/1086; H01S 3/13; H01S 5/041; H01S 3/0675; H01S 3/1301; H01S 3/2375; H01S 3/094096; H01S 3/1022; H01S 3/094011; G02F 1/395
USPC ........ 398/79, 68, 92, 141, 142, 157, 91, 160
See application file for complete search history.

(56) References Cited

U.S. PATENT DOCUMENTS

| | | | | |
|---|---|---|---|---|
| 5,959,750 A * | 9/1999 | Eskildsen | .......... | H04B 10/2916 359/334 |
| 6,167,066 A * | 12/2000 | Gaeta | .................... | H01S 3/0675 372/102 |
| 6,611,370 B2 * | 8/2003 | Namiki | .................. | H01S 3/302 359/334 |

(Continued)

*Primary Examiner* — Hibret A Woldekidan

(57) ABSTRACT

A hybrid distributed amplification method based on a random fiber laser generated within erbium fiber with low doping concentration, i.e. weak erbium-doped fiber (WEDF), which includes: Step 1. constructing a fiber link via WEDF; Step 2. generating the random fiber laser based on the fiber link, the pump source, the wavelength division multiplexer and the strong feedback module; Step 3. constructing the spatial equalized gain based on hybrid gain of the erbium fiber and random fiber laser; Step 4. the signal is amplified by the hybrid spatial equalized gain. The present invention solves the typical problem of high laser threshold and low pump conversion efficiency when conventional fiber is used to generate random fiber laser for distributed amplification.

12 Claims, 4 Drawing Sheets

(56) References Cited

U.S. PATENT DOCUMENTS

| | | | |
|---|---|---|---|
| 6,687,426 B1* | 2/2004 | May | H04B 10/0775 356/73.1 |
| 7,068,943 B2* | 6/2006 | Korolev | H04B 10/2525 385/122 |
| 7,200,344 B1* | 4/2007 | Hoshida | H04B 10/0779 398/176 |
| 7,483,639 B2* | 1/2009 | Hoshida | H01S 3/302 398/157 |
| 8,437,074 B2* | 5/2013 | Akasaka | H01S 3/06754 359/334 |
| 8,767,285 B2* | 7/2014 | Magri | H01S 3/06758 359/334 |
| 9,281,654 B2* | 3/2016 | Akasaka | H01S 3/06754 |
| 2005/0226622 A1* | 10/2005 | Trischitta | H04B 10/2916 398/92 |
| 2006/0215254 A1* | 9/2006 | Murata | H01S 3/094003 359/337 |
| 2008/0074734 A1* | 3/2008 | Nissov | H01S 3/06758 359/337 |
| 2014/0183360 A1* | 7/2014 | Rao | G01D 5/35354 250/338.1 |
| 2016/0087397 A1* | 3/2016 | Pang | H01S 3/06754 372/6 |
| 2016/0231197 A1* | 8/2016 | Baker | G01M 11/3172 |
| 2016/0248220 A1* | 8/2016 | Ou | H01S 3/30 |
| 2018/0341120 A1* | 11/2018 | Zhang | G02B 27/48 |
| 2018/0366897 A1* | 12/2018 | Wang | H01S 3/0675 |

* cited by examiner

HYBRID RANDOM FIBER LASER DISTRIBUTED AMPLIFICATION METHOD BASED ON ERBIUM FIBER WITH LOW DOPING CONCENTRATION

CROSS REFERENCE OF RELATED APPLICATION

The present application claims priority under 35 U.S.C. 119(a-d) to CN 201810759850.8, filed Jul. 11, 2018.

BACKGROUND OF THE PRESENT INVENTION

Field of Invention

The present invention relates to the field of amplification methods for long-distance optical fiber communication and long-distance optical fiber sensing, and more particularly to a hybrid distributed amplification method based on random lasing generated within erbium-doped fiber (EDF) with low doping concentration, i.e. weak erbium-doped fiber (WEDF).

Description of Related Arts

Optical fiber communication and sensing technologies have been widely used in various fields of modern society. The transmission or sensing distance of optical fiber communication or sensing systems is an important indicator of system performance. Adding a repeater with an erbium-doped fiber amplifier (EDFA) in the middle of the fiber link is an important means to extend the transmission or sensing distance. However, in practical applications such as under deep sea or on high mountains, adding a repeater in the fiber link will bring huge cost, and in some specific situations, power supply is not available in the middle of the fiber link, so it is necessary to extend the system's repeaterless transmission or sensing distance.

Adding a short segment of commercial EDF with high doping concentration in the middle of the fiber link, and then using the remote pump technology to amplify the signal, i.e., the ROPA (remote optical pump amplification) technology is a useful method to extend the repeaterless transmission/sensing distance of the system. However, because the length of the EDF with high doping concentration is short and the consumption of the pump power is very fast, this method is equivalent to applying a point amplifier in the middle of the fiber link, which cannot compensate the noise caused by the absorption and scattering of the fiber before the EDF. As a result, this method may result in relatively poor signal quality. In addition, the introduction of EDF with high doping concentration cannot avoid the high spontaneous emission noise within signal bandwidth due to the spontaneous energy level transition of erbium ions, thus this amplification method is not well suitable for long-distance fiber distributed sensing systems with requirements of high signal quality.

Distributed amplification that directly utilizes Raman scattering in conventional fiber, i.e., distributed Raman amplification (DRA) is one of the effective methods to extend the transmission distance. However, increasing the Raman pump power cannot effectively extend the transmission or sensing distance of the fiber system. The reason is that the larger the pump power, the more parts can interact with the signal, and the higher the gain along the fiber is. The signal amplified by the gain consumes the pump, so as the transmission distance increases, the energy of the pump and signal decreases. Therefore, when distributed Raman amplification is directly used in the optical fiber, the pump power continuously decreases with the length of the optical fiber, so that the gain along the fiber is continuously reduced, and the distance along which effective amplification can be performed is limited. In addition, an excessive Raman gain should result in the generation of stimulated Brillouin scattering, which makes the signal energy decay sharply along the fiber. In order to solve the problems, random fiber laser amplification (RFLA) technology has been developed. The principle of this technique is to generate a Raman random fiber laser within the fiber firstly, and then use the laser as a pump to perform distributed amplification via Raman scattering of the fiber. This technique transfers the peak of the amplifying gain distribution far away from the fiber input and output ends, allowing efficient signals to transmit farther. However, with the current technology, using traditional commercial optical fiber to generate random fiber laser, the threshold of the laser is high and the pump conversion efficiency is low. Therefore, an optimized RFLA method is required to improve long-distance optical fiber transmission and sensing performance via optimizing the pump conversion efficiency.

SUMMARY OF THE PRESENT INVENTION

An object of the present invention is to provide a hybrid distributed amplification method based on random lasing generated within WEDF. The present invention can solve the problem, i.e. when conventional optical fiber is used to generate random fiber laser, the laser threshold is high and the pump conversion efficiency is low. On the other hand, it also solves the problem, i.e. when the EDF with high doping concentration is used, the pump energy consumes rapidly, resulting in the degradation in signal-to-noise ratio (SNR) at the far end of the fiber.

A technical solution adopted by the present invention comprises steps of:

step (1) constructing a fiber link via WEDF;

step (2) combined with the pump source, the wavelength division multiplexer and the strong feedback module, generating a random fiber laser based on the fiber link;

step (3) constructing a pump for amplification of WEDF based on the random fiber laser, meanwhile performing distributed Raman amplification by the random fiber laser, so that a distributed amplification method using the hybrid of WEDF and Raman effect is capable of constructing a spatially equalized gain distribution along the fiber; and step (4) performing hybrid distributed amplification within WEDF and the Raman fiber random laser to achieve spatially equalized gain distribution along the fiber.

Preferably, the step (2) comprises steps of:

step (2.1) inputting the pump source into WEDF through a wavelength division multiplexer; and step (2.2) forming a semi-open cavity structure based on the pump source, WEDF and the strong feedback module to generate the random fiber laser.

Preferably, the doping concentration of WEDF ranges from 0.1 ppm to 3 ppm.

A long-distance optical fiber transmission system based on the method mentioned above, comprises a signal transmitter, a wavelength division multiplexer A, a wavelength division multiplexer B and a signal receiver, which are sequentially connected, and a pump source and a WEDF, and a strong feedback module; wherein the above pump source, the wavelength division multiplexer A, the strong feedback module and the WEDF are sequentially connected to generate random lasing; hybrid distributed amplification is performed on the signal by a WEDF and a Raman random laser to achieve long-distance transmission.

Preferably, the doping concentration of WEDF ranges from 0.1 ppm to 3 ppm.

The long-distance optical fiber transmission system further comprises: a filter, and an input channel of the filter is connected to the wavelength division multiplexer B, and an output channel of the filter is connected to the signal receiver for filtering self-radiation noise from the WEDF to receive the effective signal.

Preferably, the signal transmitter, the wavelength division multiplexer A, the strong feedback module, the WEDF, and the wavelength division multiplexer B are sequentially connected to extract effective signals from the amplification pump.

A fiber-optic distributed acoustic sensing system based on the method mentioned above, comprises a signal generating module, a circulator and a signal receiving and demodulation module, which are sequentially connected, and a wavelength division multiplexer connected to the circulator, and further comprising a pump source, the strong feedback module and the WEDF; wherein the pump source, the strong feedback module and the WEDF are sequentially connected to generate a random fiber laser; hybrid distributed amplification is performed on the signal by a WEDF and a Raman random fiber laser to achieve long-distance transmission and sensing.

Preferably, a doping concentration of the WEDF ranges from 0.1 ppm to 3 ppm.

The fiber-optic distributed acoustic wave sensing system further comprises: a filter, wherein a input port of the filter is connected to a third port of the circulator, and a output port of the filter is connected with a signal receiving and demodulation module for filtering out self-radiation noise caused by the WEDF; the signal generating module is connected to the first port of the circulator; the wavelength division multiplexer is connected to the second port of the circulator, and the third port of the circulator is connected to the filter for separating the effective signal from the backward transmitted light and outputting through the third port of the circulator, so that the signal receiving and demodulation module receives and detects the effective sensing signals.

In summary, due to the adoption of the above technical solutions, the beneficial effects of the present invention are:

1. The invention constructs a fiber link through WEDF, and combines a pump source, a wavelength division multiplexer and a strong feedback module to generate a random fiber laser, and uses a random fiber laser to construct an amplifying pump of the WEDF while performs distributed Raman amplification at the same time. The WEDF and distributed Raman amplifications are jointly constructed for achieving the spatially equalized gain distribution along the fiber, and the signal is distributedly amplified by the gain produced by the hybrid of WEDF and Raman random fiber laser, so that the degradation rate of SNR is reduced along the fiber. This construction solves two problems below. The one is when conventional optical fiber is used to generate random fiber laser, the threshold is high and the convention efficiency is low. The other is that the degradation of SNR before passing through the EDF cannot be mitigated. This invention generates the relatively flat gain along the fiber, so that the degradation in SNR is reduced along the fiber length, thereby long-distance fiber communication and sensing systems can be achieved.

2. The invention is applied to an optical fiber transmission or sensing system, particularly the concentration of WEDF needs to be low, so the pump consumption rate is slowed down, the generated spontaneous emission noise is reduced, and a higher SNR is generated. Therefore, this invention can make the gain along the fiber to be equalized, and avoids the disadvantages of quick pump consumption caused by high-concentrated EDF, and large degradation of SNR caused by unbalanced spatial gain and large amount of spontaneous emission noise.

3. The invention is applied to fiber transmission or sensing systems, and adopts a random fiber laser and a WEDF, so that the peak of the spatial gain distribution is far away from the input and output ends of the fiber. Thus, the spatial gain distribution is equalized relatively, and the degradation speed of SNR is slowed down, so that the long-distance transmission and sensing can be realized, and the problem of high laser threshold and low conversion efficiency of the random fiber laser using conventional optical fiber is mitigated.

BRIEF DESCRIPTION OF THE DRAWINGS

In order to illustrate the technical solutions of the embodiments of the present invention more clearly, the drawings used in the embodiments will be briefly described below. It should be understood that the following drawings only show certain embodiments of the present invention, and therefore it should not be seen as a limitation on the scope, and those skilled in the art can obtain other related drawings according to these drawings without any creative work.

Figure 1:
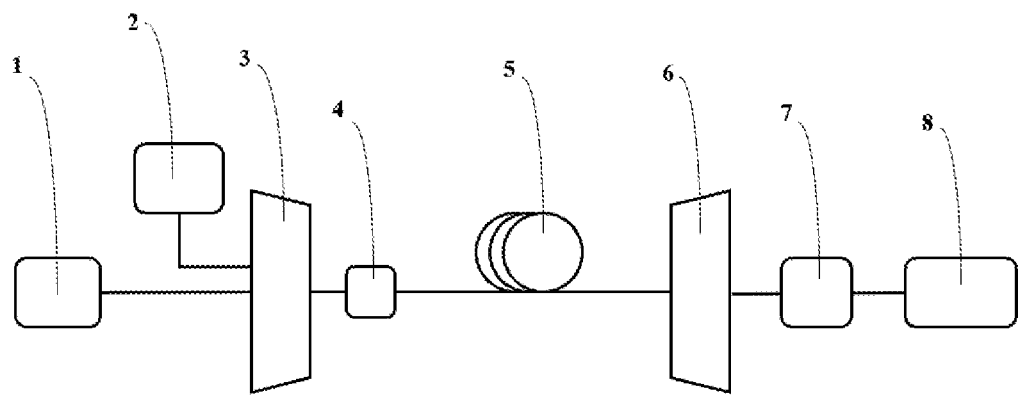
FIG. 1 is a schematic diagram of a fiber-optic transmission system, which uses the distributed hybrid amplification based on WEDF and Raman random fiber laser according to a preferred embodiment of the present invention.

Reference numbers in the drawings: 1—signal transmitter; 2—pump source, 3—wavelength division multiplexer A; 4—strong feedback module; 5—erbium fiber with low doping concentration; 6—wavelength division multiplexer B; 7—filter; 8—signal receiver; 9—signal generation module; 10—circulator; 11—wavelength division multiplexer, 12—signal receiving and demodulation module.

DETAILED DESCRIPTION OF THE PREFERRED EMBODIMENT

Further description of the present invention will be described in detail below combining with the accompanying drawings and preferred embodiments. It should be understood that the preferred embodiments described herein are merely illustrative of the invention and are not intended to limit the invention. The components of the preferred embodiments of the invention, which are generally described and illustrated in the Figures herein, may be arranged and designed in various different configurations.

Therefore, the following detailed description of the preferred embodiments of the present invention in the claims. All other preferred embodiments obtained by those skilled in the art based on the embodiments of the present invention without creative efforts are within the scope of the present invention.

It should be noted that the terms "first" and "second" and the like are used to distinguish one entity or operation from another entity or operation, and do not necessarily require or imply these entities or operations. There is any such actual relationship or order between them. Furthermore, the term "comprises" or "comprises" or "comprises" or any other variants thereof is intended to encompass a non-exclusive inclusion, such that a process, method, article, or device that comprises a plurality of elements comprises not only those elements but also other elements, or elements that are inherent to such a process, method, item, or device. An element that is defined by the phrase "comprising a . . . " does not exclude the presence of additional equivalent elements in the process, method, item, or device that comprises the element.

Technical Problems

Solve the problem of high laser threshold and low pump conversion efficiency in random fiber laser generated in conventional optical fiber, when it is used for distributed amplification; and solve the problem that when erbium fiber with high doping concentration is employed only, there is rapid consumption of pump energy and huge degradation of SNR before the EDF.

Technical solution of the present invention comprises steps of:

step (1) constructing a fiber link via WEDF;

step (2) combined with the pump source, the wavelength division multiplexer and the strong feedback module, generating a random fiber laser based on the fiber link;

step (3) constructing a pump for amplification of WEDF based on random fiber laser, meanwhile performing distributed Raman amplification by the random fiber laser, so that a distributed amplification method used the hybrid of WEDF and Raman effects is capable of constructing a spatial equalized gain along the fiber; and step (4) performing hybrid distributed amplification within WEDF and the Raman fiber random laser to achieve spatially equalized gain distribution along the fiber.

Preferably, the step (2) comprises steps of:

step (2.1) inputting the pump source into the WEDF through a wavelength division multiplexer; and step (2.2) forming a semi-open cavity structure based on the pump source, the WEDF and the strong feedback module to generate the random fiber laser.

Preferably, a doping concentration of the EDF ranges from 0.1 ppm to 3 ppm.

A long-distance optical fiber transmission system based on the method mentioned above, comprises a signal transmitter 1, a wavelength division multiplexer A 3, a wavelength division multiplexer B 6 and a signal receiver 8, which are sequentially connected, and a pump source 2 and a WEDF 5, and a strong feedback module 4; wherein the above pump source 2, the wavelength division multiplexer A 3, the strong feedback module 4 and the WEDF 5 are sequentially connected to generate random fiber laser; hybrid distributed amplification is performed on the signal by a WEDF and a Raman random fiber laser to achieve long-distance fiber transmission.

Preferably, a doping concentration of WEDF ranges from 0.1 ppm to 3 ppm.

The long-distance optical fiber transmission system further comprises: a filter, and an input channel of the filter is connected to the wavelength division multiplexer B, and an output channel of the filter is connected to the signal receiver for filtering self-radiation noise from the WEDF to receive the effective signal.

Preferably, the signal transmitter 1, the wavelength division multiplexer A 3, the strong feedback module 4, the WEDF 5, and the wavelength division multiplexer B 6 are sequentially connected to extract effective signals from the amplification pump.

A fiber-optic distributed acoustic sensing system based on the method mentioned above, comprises a signal generating module 9, a circulator 10 and a signal receiving and demodulation module 12, which are sequentially connected, and a wavelength division multiplexer 11 connected to the circulator 10, and further comprising a pump source 2, the strong feedback module 4 and the WEDF 5; wherein the pump source 2, the strong feedback module 4 and the WEDF 5 are sequentially connected to generate a random fiber laser; hybrid distributed amplification is performed on the signal by a WEDF and a Raman random fiber laser to achieve long-distance fiber transmission and sensing.

Preferably, a doping concentration of the erbium fiber with low doping concentration ranges from 0.1 ppm to 3 ppm.

The fiber-optic distributed acoustic wave sensing system further comprises: a filter 7, wherein an input channel of the filter 7 is connected to a third port of the circulator 10, and an output channel of the filter 7 is connected with a signal receiving and demodulation module 12 for filtering out self-radiation noise caused by WEDF; the signal generating module 9 is connected to the first port of the circulator 10; the wavelength division multiplexer 11 is connected to the second port of the circulator 10, and the third port of the circulator 10 is connected to the filter 12 for separating the effective signal from the backward transmitted light and outputting through the third port of the circulator 10, so that the signal receiving and demodulation module receives and detects the effective sensing signals.

Embodiment 1

A hybrid distributed amplification method based on random lasing generated within WEDF, comprises steps of:

step (1) constructing a fiber link via WEDF;

step (2) combined with the pump source, the wavelength division multiplexer and the strong feedback module, generating a random fiber laser based on the fiber link;

step (3) constructing a pump for amplification of WEDF based on the random fiber laser, meanwhile performing distributed Raman amplification by the random fiber laser, so that a distributed amplification method using the hybrid of WEDF and Raman effects is capable of constructing a spatially equalized gain distribution along the fiber; and step (4) performing hybrid distributed amplification within WEDF and the Raman fiber random laser to achieve spatially equalized gain distribution along the fiber.

Figure 6:
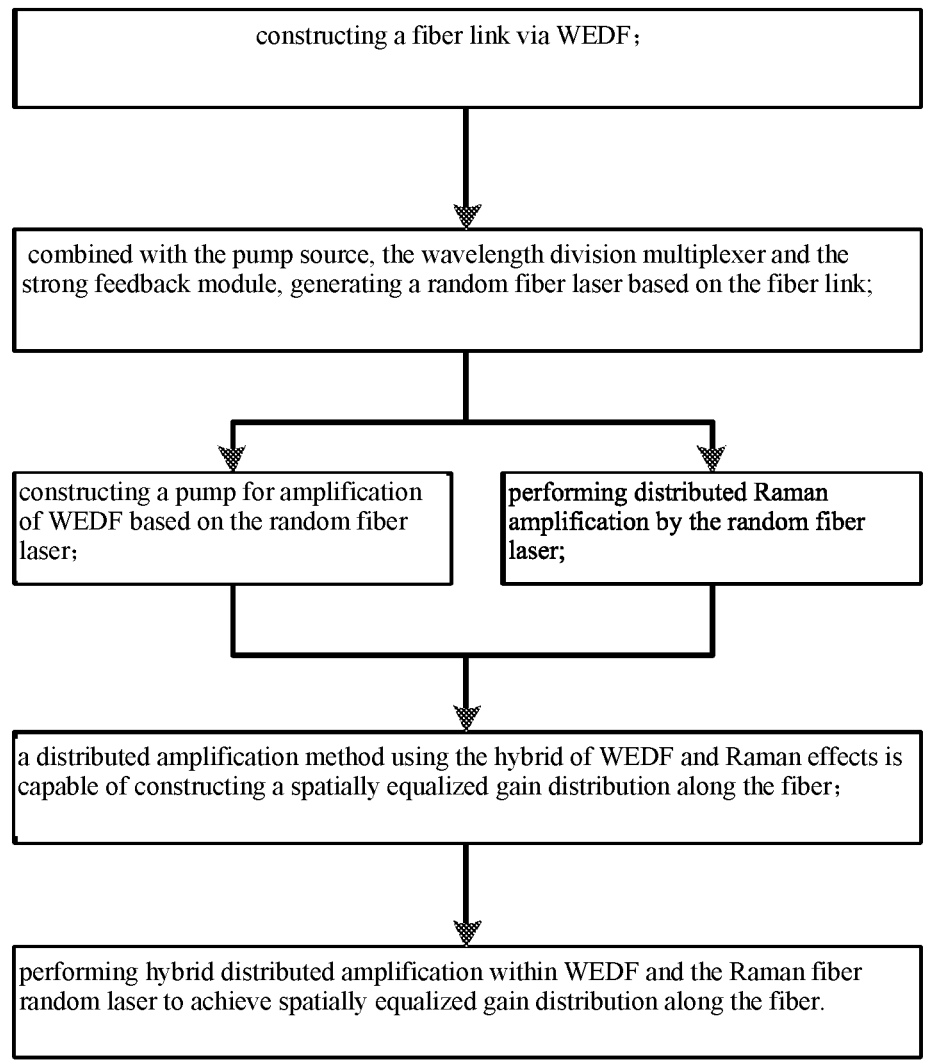
FIG. 6 is a flow chart of a method according to a preferred embodiment of the present invention.

As shown in FIG. 6, a concentration of the EDF is taken at any value in a range from 0.1 ppm to 3 ppm. The reason of choosing WEDF is that, the pump consumption rate is slow, resulting in a flatter spatial gain along the fiber. Meanwhile, the spontaneous emission noise generated in the signal band is reduced, which is favorable for generating a higher SNR, and avoiding the high pumping loss caused by the high-concentrated EDF, and overcoming the problem that the imbalance of the spatial domain gain leads to large degradation of SNR and high spontaneous emission noise. The method utilizes the random fiber laser to pump the WEDF and perform distributed Raman amplification. Thus, the peak of the spatial gain is far away from the input and output ends of the fiber, which promotes the equalization of the spatial gain along the fiber, so that the degradation rate of SNR slows down.

Embodiment 2

A long-distance optical fiber transmission system, comprising a signal transmitter 1, a wavelength division multiplexer A 3, a wavelength division multiplexer B 6, a signal receiver 8, a pump source 2, a WEDF 5, a strong feedback module 4, and a filter 7, as shown in FIG. 1;

In the optical fiber transmission system within 1550 nm waveband, the doping concentration of the EDF 5 is set as 1.5 ppm. The signal transmitter 1 emits continuous light with 1550 nm wavelength and 0.0001 W output power, and pumping source 2 is a high-power fiber laser with 1365 nm wavelength and 1.5 W output power. Both the wavelength division multiplexer A 3 and the wavelength division multiplexer B 6 have two multiplexing ports of 1550 nm and 1365 nm. The strong feedback module 4 is the fiber Bragg grating with a center wavelength of 1480 nm. The length of the WEDF 5 is 100 km. The signal transmitter 1 generates a signal, and the signal transmits into the WEDF 5 through the wavelength division multiplexer A 3. The pump source 2 is input into the fiber through the wavelength division multiplexer A 3. The WEDF 5 and the strong feedback module 4 form a semi-open cavity structure to generate a random fiber laser, which provides distributed pumping for the WEDF 5, while performs distributed Raman amplification. The signal is amplified by the hybrid of WEDF and Raman random fiber laser. The wavelength division multiplexer B 6 separates the effective signal from the amplification pump. The filter 7 is used to filter out the spontaneous emission noise caused by the WEDF. The signal receiver 8 is used for receiving and detecting the effective signal.

A laser of 1365 nm wavelength is used as a pump for generating a random fiber laser in the 1480 nm waveband, and the signal light within 1550 nm waveband is amplified by the distribution amplification generated by the WEDF and Raman random fiber laser. The specific formulas are as follows:

$$\frac{dP_1^\pm}{dz} = \pm \varepsilon_1 P_1^m + P_1^\pm \cdot \left[ml_1 mg_1^{Raman} \frac{f_1}{f_2}(P_2^+ + P_2^- + \Gamma_2)\right] \quad (1)$$

$$\frac{dP_2^\pm}{dz} = \pm \varepsilon_2 P_2^m \pm g_1^{Raman}(P_1^+ + P_1^-) \cdot 0.5\Gamma_2 + \quad (2)$$
$$P_2^\pm \cdot \left[ml_2 \pm g_1^{Raman}(P_1^+ + P_1^-) mg_2^{Raman}\frac{f_2}{f_3}(P_3^+ + P_3^- + \Gamma_3)\right] \pm$$
$$(\alpha_1 + g_1^{Er})\frac{\overline{N_2}}{N_t}P_2^\pm \pm g_1^{Er}\frac{\overline{N_2}}{N_t} \cdot 2h\nu_2\Delta n_1$$

$$\frac{dP_3^\pm}{dz} = \pm \varepsilon_3 P_3^m \pm g_2^{Raman}(P_2^+ + P_2^-) \cdot 0.5\Gamma_3 + \quad (3)$$
$$P_3^\pm \cdot [ml_3 \pm g_2^{Raman}(P_2^+ + P_2^-)] \pm (\alpha_2 + g_2^{Er})\frac{\overline{N_2}}{N_t}P_3^\pm \pm g_2^{Er}\frac{\overline{N_2}}{N_t} \cdot 2h\nu_3\Delta n_2$$

In Equation (1), (2) and (3), supplementary equations are as follows:

$$\Gamma_i = 4hf_i\Delta f_{i-1}\left\{1 + \frac{1}{\exp[h(f_{i-1} - f_i)/(K_BT)] - 1}\right\} \quad (4)$$

$$\frac{\overline{N_2}}{N_t} = \frac{\frac{(P_2^+ + P_2^-)\alpha_1}{hf_2\xi} + \frac{(P_3^+ + P_3^-)\alpha_2}{hf_3\xi}}{\frac{(P_2^+ + P_2^-)(\alpha_1 + g_1^{Er})}{hf_2\xi} + \frac{(P_3^+ + P_3^-)(\alpha_2 + g_2^{Er})}{hf_3\xi}} \quad (5)$$

Among them, $P_1$, $P_2$, and $P_3$ respectively represent the power of light within the waveband around 1365 nm, 1480 nm and 1550 nm; the superscript "+" represents the light transmits in the positive direction, and the superscript "−" presents the light transmitted in the opposite direction. $\varepsilon_1$, $\varepsilon_2$ and $\varepsilon_3$ respectively represent the Rayleigh scattering coefficients of the fibers in 1365 nm, 1480 nm, and 1550 nm wavebands; $I_1$, $I_2$ and $I_3$ represent background loss coefficients for 1365 nm, 1480 nm, and 1550 nm, respectively; $h\nu_1$, $h\nu_2$ and $h\nu_3$ represent photon energy of 1365 nm, 1480 nm, and 1550 nm, respectively, $f_1$, $f_2$ and $f_3$ represent optical frequencies of 1365 nm, 1480 nm, and 1550 nm, respectively; $\Delta f_1$, $\Delta f_2$ and $\Delta f_3$ represent linewidths to be considered in the 1365 nm, 1480 nm, and 1550 nm wavebands, respectively. $g_1^{Raman}$ is the Raman gain of 1480 nm light produced by 1365 nm light, and $g_2^{Raman}$ is the Raman gain of 1550 nm light produced by 1480 nm light. $\alpha_1$ represents the absorption coefficient of 1480 nm light in the WEDF, while $\alpha_2$ indicates the absorption coefficient of 1550 nm light in the WEDF. $g_1^{Er}$ is the gain coefficient of erbium irons within 1480 nm waveband in WEDF, and $g_2^{Er}$ is the gain coefficient of erbium irons within 1550 nm waveband in the WEDF. $\Delta n_1$ represents the noise bandwidth considered in 1480 nm waveband in the WEDF, $\Delta n_2$ represents the noise bandwidth of light in the 1550 nm waveband in the WEDF. z is the distance along the fiber; h is the Planck constant; $K_B$ is the Boltzmann constant; T is the absolute temperature; $\xi$ represents the ratio of the erbium ion linear density to the metastable relaxation time.

Figure 2:
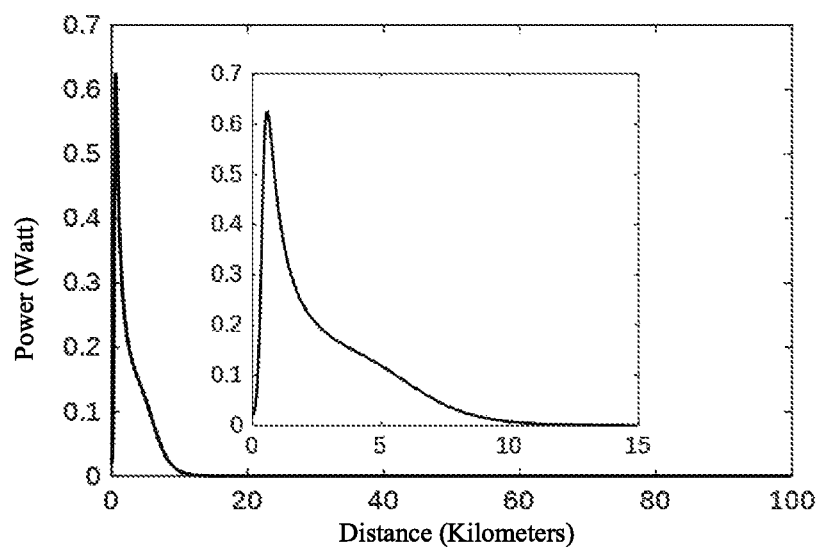
FIG. 2 is a simulation diagram of power distribution of light in the 1480 nm waveband along the optical fiber of the present invention.
Figure 3:
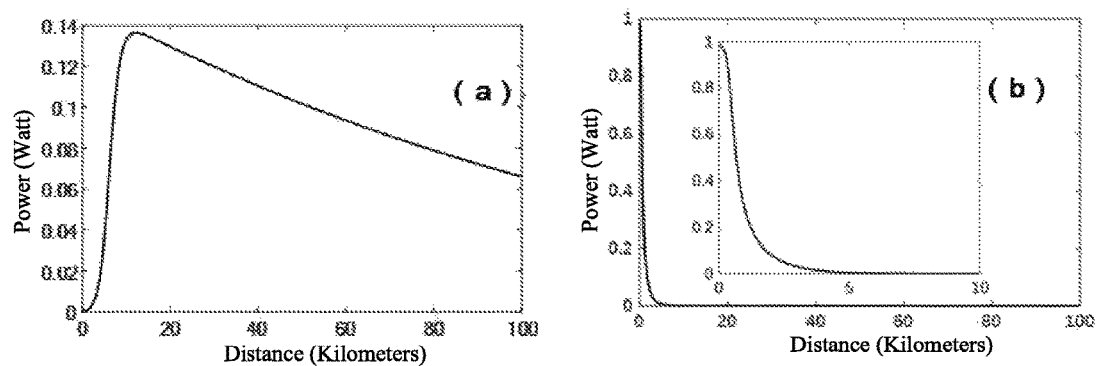
FIG. 3 is a simulation diagram of the power distribution of the signal light in the 1550 nm waveband along the optical fiber according to the present invention. (a) is a power distribution simulation diagram of the forward transmitted light along the optical fiber, and (b) is a power distribution simulation diagram of the backward transmitted light along the optical fiber.
Figure 4:
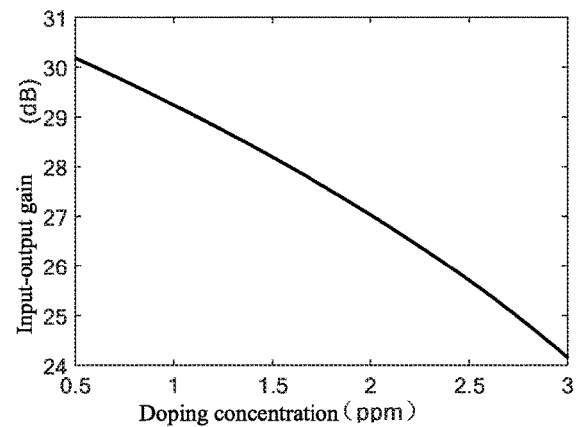
FIG. 4 is a diagram showing input-output gains of a fiber optic transmission system using erbium fiber with different doping concentrations according to the present invention.

According to the calculation, the simulation results obtained are shown in FIG. 2-4. FIG. 2-3 shows the simulation results of an optical transmission system in the condition that the doping concentration of WEDF is set as 1.5 ppm. FIG. 2 shows the power distribution of 1480 nm light along the fiber. Since the use of EDF reduces the threshold of Raman effects compared to that in commercial fiber, the power of 1480 nm light reaches a peak near the input edge, and then rapidly attenuates due to the amplification of the EDF; when the effect of the erbium ions weakens to a certain extent, the effect of the distributed Raman amplification is occupied. As a result, at the location about 3 km, the attenuation rate of 1480 nm light slows down, and the 1480 nm light is almost completely consumed at about 10 km. As shown in FIG. 3(a), which is the power distribution of 1550 nm light along the optical fiber in the forward direction, the power of the signal light reaches a maximum at about 10 km, and then gradually attenuates. FIG. 3(b) shows the power distribution of 1550 nm light along the fiber in the backward direction. Since the Raman effects are not suppressed in the system but are enhanced, the power of the backward Rayleigh scattering light is amplified by the hybrid of WEDF and Raman effects. It can be seen from FIG. 3(b) that in the distributed amplifying system based on random fiber laser generated through WEDF, extremely high gain for backward Rayleigh scattering can be provided, since the Raman effects in the fiber are easily affected by the stimulated radiation of the erbium ions.

The input-output gains of the fiber transmission system at different doping concentrations of erbium fiber are shown in FIG. 4. When the doping concentration is in the range from 0.1 ppm to 3 ppm, the smaller the doping concentration, the larger the input-output gain can be obtained. The reason is that the greater the concentration, the greater background attenuation coefficient of the fiber. Although a higher doping concentration results in a larger gain near the input edge, for long-distance sensing, the attenuation of amplification pump is high around the front end, and the signal is not effectively amplified when it is far from the input edge. Therefore, higher input-output gain can be obtained when the doping concentration is lower. On the other hand, without the use of EDF, under the condition that only conventional optical fiber is used to generate Raman random fiber laser to distributedly amplify, and the input-output gain is lower than that of EDF. The reason is that the combination of EDF and random fiber laser provides the hybrid gain, which promotes the spatial gain along the fiber to be equalized, and the use of the EDF reduces the threshold of the Raman random fiber laser and improves the conversion efficiency of pump when Raman random fiber laser is generated.

Embodiment 3

Figure 5:
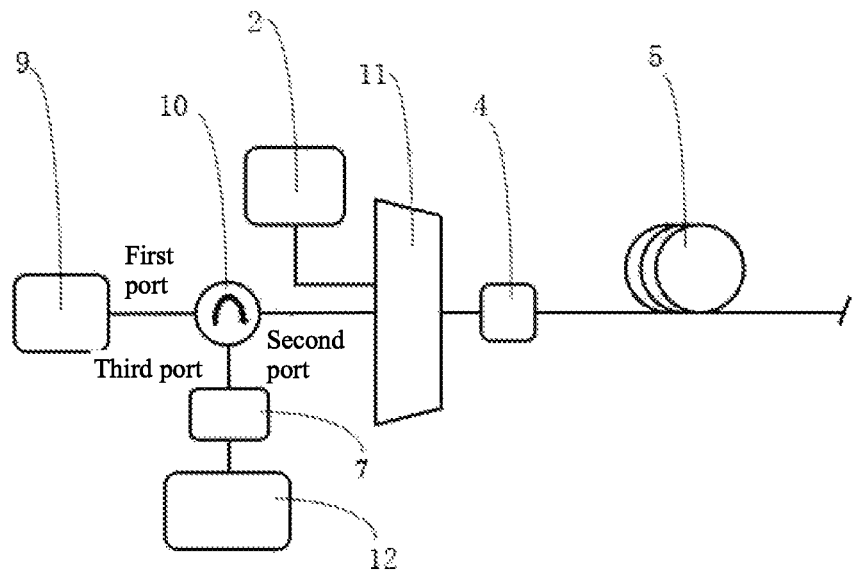
FIG. 5 is a schematic diagram of a distributed optical fiber distributed acoustic wave sensing system based on WEDF according to the present invention.

A fiber distributed acoustic sensing system, comprising a signal generating module 9, a circulator 10, a signal receiving and demodulation module 12, a wavelength division multiplexer 11, a pump source 2, a strong feedback module 4, a WEDF 5 and a filter 7. The signal generating module 9 is connected to the first port of the circulator 10, the wavelength division multiplexer 11 is connected to the second port of the circulator 10, the third port of the circulator 10 is connected to the signal receiving and demodulation module 12. Preferably, the input of the filter 7 is connected to the third port of the circulator 10, and the output of the filter 7 is connected to the signal receiving and demodulation module 12. The above expressions are shown in FIG. 5. In the optical fiber sensing system within 1550 nm waveband, the doping concentration of the WEDF 5 is 1.5 ppm. The signal generating module 9 generates a modulated sensing signal, which is input into the wavelength division multiplexer 11 through the second port of the circulator 10, and then is input to the WEDF 5 for transmission; the pump source 2 inputs into the EDF through the wavelength division multiplexer 11. The wavelength division multiplexer 11 together with the strong feedback module 4, forms a semi-open cavity structure to generate a random laser within the optical fiber, which provides pumping for the WEDF 5, while performs distributed Raman amplification. The signal is amplified by the hybrid gain produced by the WEDF and the Raman random fiber laser. The wavelength division multiplexer 11 separates the effective signal from other wavelengths, and then makes it input the circulator 10 through the second port and output the circulator 10 through the third port. Preferably, the filter 7 is used to filter out the spontaneous emission noise caused by the WEDF. The signal receiving and demodulation module 12 is configured to receive and detect an effective sensing signal.

In the fiber distributed acoustic wave sensing system within 1550 nm waveband, the doping concentration of the WEDF is set as 1.5 ppm. The signal transmitter emits a continuous optical signal with 1550 nm wavelength and 0.0001 W output power. The pump source is a high-power fiber laser with 1365 nm wavelength and the output power is 1.5 W. Both the wavelength division multiplexer A and the wavelength division multiplexer B have two multiplexing ports of 1550 nm and 1365 nm. The strong feedback module is the fiber Bragg grating with 1480 nm center wavelength. The length of the WEDF is 100 km. The effective sensing signal light in 1550 nm waveband is amplified by the hybrid of the WEDF and the random fiber laser generated in the fiber link, so the valid signal with a high SNR can be received from the third port of circulator in the system.

The above is only the preferred embodiment of the present invention, and is not intended to limit the present invention. Any modifications, equivalent substitutions and improvements made within the spirit and principles of the present invention should be included in the protection of the present invention.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention comprises all modifications encompassed within the spirit and scope of the following claims.

What is claimed is:

1. A hybrid distributed amplification method based on random lasing generated within erbium-doped fiber (EDF), comprises steps of:
   step (1) constructing a fiber link via EDF;
   step (2) combined with a pump source, the wavelength division multiplexer and the feedback module, generating a random fiber laser based on the fiber link;
   step (3) constructing a pump for amplification of EDF based on the random fiber laser, meanwhile performing distributed Raman amplification by the random fiber laser, so that a distributed amplification method using the hybrid of EDF and Raman effects is capable of constructing a spatially equalized gain distribution along the fiber; and
   step (4) performing hybrid distributed amplification within EDF and the Raman fiber random laser to achieve spatially equalized gain distribution along the fiber;
   wherein the step (2) comprises steps of:
   step (2.1) inputting the pump source into EDF through a wavelength division multiplexer; and
   step (2.2) forming a semi-open cavity structure based on the pump source, EDF and the feedback module to generate the random fiber laser.

2. The hybrid distributed amplification method based on random lasing generated within EDF, as recited in claim 1, wherein a doping concentration of the EDF ranges from 0.1 ppm to 3 ppm.

3. The hybrid distributed amplification method based on random lasing generated within EDF, as recited in claim 1, wherein a doping concentration of the EDF ranges from 0.1 ppm to 3 ppm.

4. A long-distance optical fiber transmission system based on the method of claim 1, comprising a signal transmitter (1), a wavelength division multiplexer A (3), a wavelength division multiplexer B (6) and a signal receiver (8), which are sequentially connected, and a pump source (2) and a EDF (5), and a feedback module (4); wherein the above pump source (2), the wavelength division multiplexer A (3), the feedback module (4) and the EDF (5) are sequentially connected to generate random fiber laser; hybrid distributed amplification is performed on the signal by a EDF and a Raman random fiber laser to achieve long-distance fiber transmission.

5. The long-distance optical fiber transmission system, as recite in claim 4, wherein a doping concentration of the EDF ranges from 0.1 ppm to 3 ppm.

6. The long-distance optical fiber transmission system, as recite in claim 5, further comprising: a filter (7), and an input channel of the filter (7) is connected to the wavelength division multiplexer B (6), and an output channel of the filter (7) is connected to the signal receiver (8) for filtering self-radiation noise from the EDF to receive the effective signal.

7. The long-distance optical fiber transmission system, as recite in claim 5, wherein the signal transmitter (1), the wavelength division multiplexer A (3), the feedback module (4), the EDF (5), and the wavelength division multiplexer B (6) are sequentially connected to extract effective signals from the amplification pump.

8. The long-distance optical fiber transmission system, as recite in claim 6, wherein the signal transmitter (1), the wavelength division multiplexer A (3), the feedback module (4), the EDF (5), and the wavelength division multiplexer B (6) are sequentially connected to extract effective signals from the amplification pump.

9. A fiber-optic distributed acoustic sensing system based on the method of claim 1, comprising a signal generating module (9), a circulator (10) and a signal receiving and demodulation module (12), which are sequentially connected, and a wavelength division multiplexer (11) connected to the circulator (10), and further comprising a pump source (2), the feedback module (4) and the EDF (5); wherein the pump source (2), the feedback module (4) and the EDF (5) are sequentially connected to generate a random fiber laser; hybrid distributed amplification is performed on the signal by a EDF and a Raman random laser to achieve long-distance fiber transmission and sensing.

10. The fiber-optic distributed acoustic wave sensing system, as recited in claim 9, wherein a doping concentration of the EDF ranges from 0.1 ppm to 3 ppm.

11. The fiber-optic distributed acoustic wave sensing system, as recited in claim 9, further comprising: a filter (7), wherein an input channel of the filter (7) is connected to a third port of the circulator (10), and an output channel of the filter (7) is connected with a signal receiving and demodulation module (12) for filtering out self-radiation noise caused by the EDF; the signal generating module (9) is connected to the first port of the circulator (10); the wavelength division multiplexer (11) is connected to the second port of the circulator (10), and the third port of the circulator (10) is connected to the signal receiving and demodulation module (12) for separating the effective signal from the amplifying pump source and outputting through the third port of the circulator (10), so that the signal receiving and demodulation module receives and detects the effective sensing signals.

12. The fiber-optic distributed acoustic wave sensing system, as recited in claim 10, further comprising: a filter (7), wherein an input channel of the filter (7) is connected to a third port of the circulator (10), and an output channel of the filter (7) is connected with a signal receiving and demodulation module (12) for filtering out self-radiation noise caused by the EDF; the signal generating module (9) is connected to the first port of the circulator (10); the wavelength division multiplexer (11) is connected to the second port of the circulator (10), and the third port of the circulator (10) is connected to the signal receiving and demodulation module (12) for separating the effective signal from the backward transmitted light and outputting through the third port of the circulator (10), so that the signal receiving and demodulation module receives and detects the effective sensing signals.

\* \* \* \* \*